United States Patent [19]

Stromberg

[11] Patent Number: 4,771,528

[45] Date of Patent: Sep. 20, 1988

[54] WHEEL SPINDLE PULLER

[76] Inventor: Richard Stromberg, 27 Chandler St., Tomahawk, Wis. 54487

[21] Appl. No.: 99,493

[22] Filed: Sep. 22, 1987

[51] Int. Cl.[4] .................. B23P 19/04

[52] U.S. Cl. .................. 29/259

[58] Field of Search .................. 29/258, 259, 260, 263, 29/264

[56] References Cited

U.S. PATENT DOCUMENTS

| | | | |
|---|---|---|---|
| 1,311,272 | 7/1919 | Gumpper | 29/264 |
| 1,807,329 | 5/1931 | West et al. | 29/264 |
| 1,895,448 | 1/1933 | Cornwell | 29/264 |
| 2,288,906 | 7/1942 | Kaplan | 29/260 |
| 2,736,954 | 3/1956 | Palmer | 29/259 |
| 2,789,343 | 4/1957 | Millsap | 29/259 |
| 4,502,197 | 3/1985 | Harder | 29/259 |

OTHER PUBLICATIONS

Article entitled "Zf-Einwalzmaschinen", of Dec. 19, 1984, by Zahnradfabrik Friedrichshafen AG, pp. 2, 3, 4, 5.

*Primary Examiner*—Robert C. Watson
*Attorney, Agent, or Firm*—Fleit, Jacobson, Cohn & Price

[57] ABSTRACT

A wheel spindle puller for removing the front wheel spindle on four-wheel drive vehicles such as pickup trucks and similar vehicles. The puller includes a base plate having two hardened steel cap bolts mounted thereon and securely retained in place by jam nuts together with a puller bar movably guided on the bolts with the puller bar including a central, internally threaded bore receiving an elongated central externally threaded bolt having a swivel center point head at its inner end which is aligned with an enlarged aperture in the base plate. The puller is associated with the spindle with the base plate having a thickness to fit properly on an unthreaded part of the spindle located just inwardly of the externally threaded outer end of the spindle and is held thereon by the existing bearing retaining nuts with the central threaded bolt having the swivel center point thereon then being engaged with the end of the axle shaft which extends outwardly from the spindle so that a wrench can be used to tighten the center bolt and pull the spindle from the axle shaft.

11 Claims, 1 Drawing Sheet

WHEEL SPINDLE PULLER

BACKGROUND OF THE INVENTION

1. Field of the Invention

The present invention generally relates to a wheel spindle puller and more particularly a device for removing the front wheel spindle on four-wheel drive vehicles such as pickup trucks and similar vehicles. The puller includes a base plate having two hardened steel cap bolts mounted thereon and securely retained in place by jam nuts together with a puller bar movably guided on the bolts with the puller bar including a central, internally threaded bore receiving an elongated central externally threaded bolt having a swivel centerpoint head at its inner end which is aligned with an enlarged apperture in the base plate. The puller is associated with the spindle with the base plate having a thickness to fit properly on an unthreaded part of the spindle located just inwardly of the externally threaded outer end of the spindle and is held thereon by the existing bearing retaining nuts with the central threaded bolt having the swivel center point thereon then being engaged with the end of the axle shaft which extends outwardly from the spindle so that a wrench can be used to tighten the center bolt and pull the spindle from the steering arm and axle shaft.

2. Information Disclosure Statement

Mechanical pulling and pushing devices are generally well-known for removing gears, hubs and the like. However, a puller for the front wheel spindle of a four-wheel drive pickup truck and the like is not available. During normal repair and maintenance work on four-wheel drive vehicles, the front wheel spindle must be removed to perform certain repairs including replacement of the universal joints in the front axle shafts, repack the inner spindle needle bearings with grease, replace the grease and dust seals on the steering knuckle assembly, replace ball joints on the steering knuckle assembly and to remove the front axle carrier assembly. The front wheel spindle becomes quite difficult to remove after the vehicle has been driven for a relatively short period of time since the backside of the spindle is exposed to road dirt, water and various corrosion inducing materials which renders it difficult to remove the spindle. The presently available gear pullers, bearing pullers and the like which are commercially available and those in the prior patents cannot be effectively used to remove the front wheel spindle of a four-wheel drive vehicle. A separate information disclosure statement will be filed.

SUMMARY OF THE INVENTION

An object of the present invention is to provide a front wheel spindle puller for four-wheel drive vehicles such as pickups and the like in order to facilitate the removal of the spindle from the steering arm without damage to the axle shaft, the splines thereon, the center hole in the end thereof and without damage to the threads on the spindle.

Another object of the invention is to provide a spindle puller in accordance with the preceding object in which the puller includes a base plate having a central apperture with a diameter only slightly larger than the diameter of the spindle for close fitting telescopic relation thereto with the thickness of the base plate being substantially the same as the width of an unthreaded portion of the spindle oriented between the externally threaded outer end of the spindle and that portion of the spindle which increases in diameter with the base plate having a pair of guide bolts rigidly affixed thereto and extending outwardly therefrom in parallel spaced relation for receiving a puller bar thereon which is limited as to its outward movement by the bolts with the puller bar including a central threaded bolt having an inner end engageable with the outer end of the axle shaft and an outer end shaped to receive a wrench by which the center bolt can be tightened to exert outward force on the spindle for removing it from the axle shaft.

A further object of the invention is to provide a spindle puller in accordance with the preceding objects in which the central bolt is provided with a swiveled center point head engagaeble in the internally threaded hole in the outer end of the axle shaft for reducing the torque required to rotate the center bolt and reduce possible damage to the threaded hole.

Still another object of the present invention is to provide a spindle puller which is simple in construction, effective in use, safe, long-lasting and relatively inexpensive to manufacture.

Together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
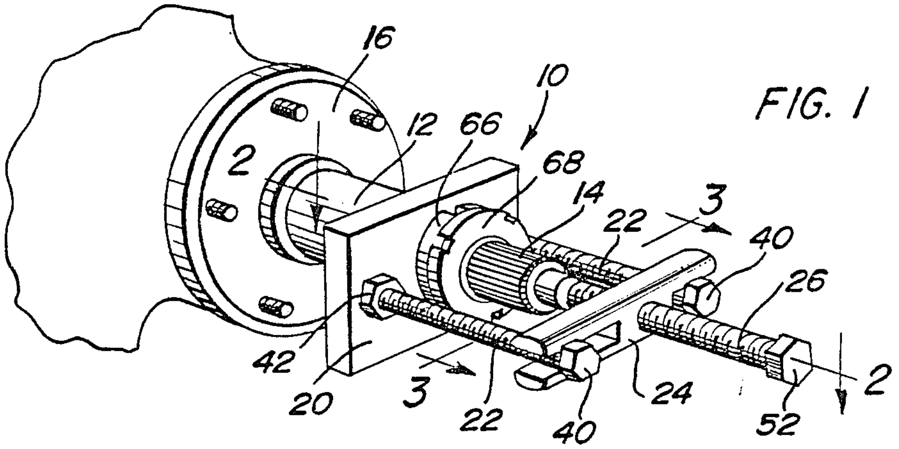
FIG. 1 is a perspective view of the spindle puller of the present invention illustrating the manner in which it is mounted on a front wheel spindle of a four-wheel drive vehicle.

Referring now specifically to the drawings, the front wheel spindle puller of the present invention is generally designated by reference numeral 10 and is used to remove the front wheel spindle 12 from the axle shaft in a four-wheel drive pickup or similar vehicles having a front wheel drive arrangement in which the spindle 12 and brake backing plate mounting plate 16 are connected with the steering arm and knuckle arrangement (not shown) in a conventional manner.

The spindle puller 10 includes a base plate 20, a pair of guide bolts 22, a puller bar 24, a central bolt 26 and a center point head 28. These components have specific structural features and relationships as set forth hereinafter to effectively pull the spindle to remove it from the steering arm without damage to the external splines 30 or the internally threaded hole 32 on the axle shaft 14.

Figure 2:
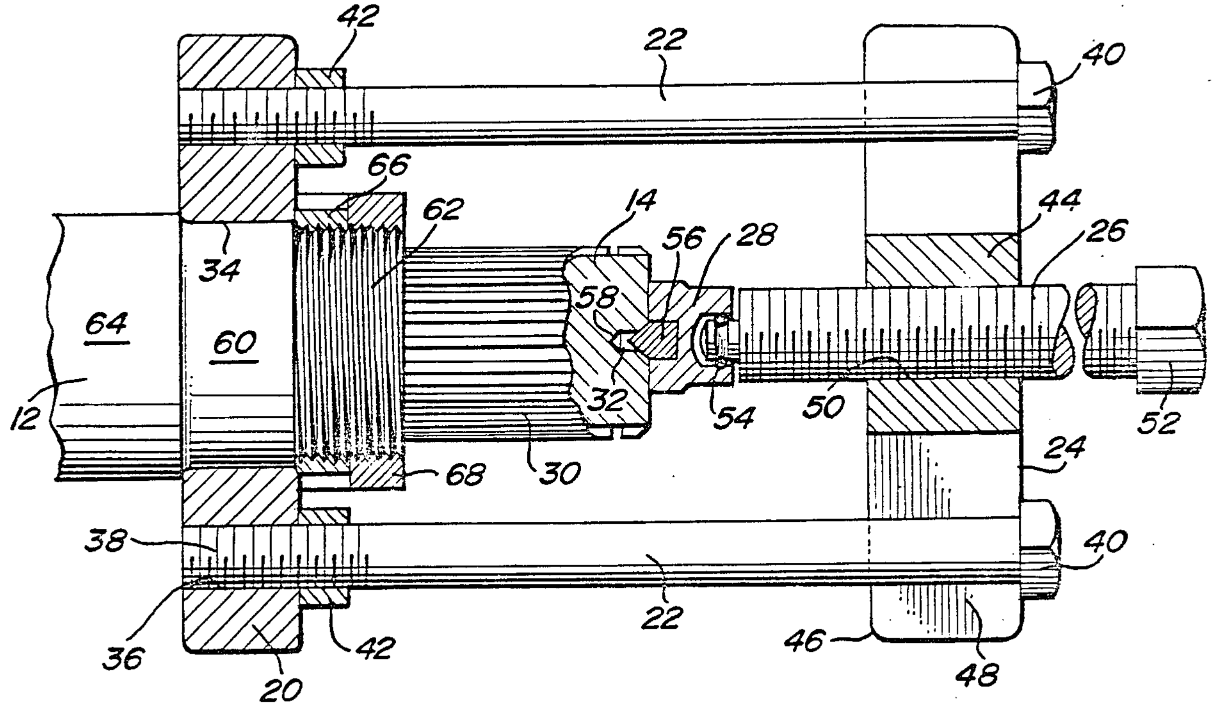
FIG. 2 is a longitudinal, sectional view of the spindle puller illustrating further associational relationship with the front wheel spindle of a four-wheel drive vehicle.
Figure 3:
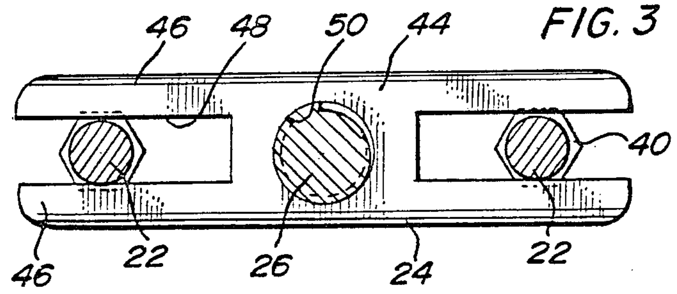
FIG. 3 is a transverse sectional view taken along section line 3—3 on FIG. 2 illustrating the relationship of the puller bar, guide bolts and center bolt.

The base plate 20 is in the form of a rectangular plate of solid steel having a width of 3", a length of 4" and a thickness of $\frac{3}{4}$". A centrally disposed large opening 34 is provided in the base plate 20 having a diameter of $1\frac{5}{8}$" for closely receiving the spindle 12 in a manner more clearly described hereinafter. Also, the base plate includes a pair of internally threaded holes or bores 36 extending therethrough which are located with their centers aligned with the center of the central hole 34 and generally equally spaced between the side edges of the base plate and the periphery of the central hole 34. Screw threaded into the holes 36 are the guide bolts 22 which have an externally threaded end portion 38 that is threaded into the base plate so that the guide bolt 22 does not project beyond one surface of the base plate. The guide bolts are hardened steel bolts that are ⅜" in diameter and 6" long and provided with a polygonal enlarged head 40 at the end thereof remote from the threaded end portion 38 as illustrated in FIG. 2. Jam nuts or lock nuts 42 are threaded on the inner end of the threaded end portion 38 so they can be tightened down against the surface of the base plate 20 to rigidly and securely lock the bolts 22 in place on the base plate 20.

The puller bar 24 includes a central solid steel body 44 having a pair of laterally extending, parallel, spaced legs 46 on each side thereof to define outwardly opening slots 48 which straddle and receive the guide bolts 22 with the heads 40 of the bolts 22 limiting the outward movement of the puller bar 24. The central body 44 of the puller bar has an internally threaded hole or bore 50 extending therethrough for threadedly receiving the externally threaded center bolt 26. The center bolt 26 is a ⅝" externally threaded hardened steel bolt having a polygonal head 52 at the outer end thereof and the hardened steel center point 28 on the inner end thereof with the center point being connected to the inner end of the center bolt 26 by a swivel connection 54 with the end of the center point head 28 including a reduced axial projection 56 having a center point 58 thereon which is adapted to engage, align with and be retained in the threaded hole 32 in the end of the axle shaft 14 as illustrated in FIGS. 1 and 2.

When removing the spindle 12, the front wheel will be removed as illustrated in FIG. 1 and the base plate 22 has the proper width to fit on the unthreaded part 60 of the spindle 12 so that it is located just inwardly of the externally threaded portion 62 and just outwardly of the increased diameter portion 64 of the spindle 12. Also, the central hole 34 closely fits on the spindle with very little clearance which is very significant in the event the base plate must be struck with a heavy hammer which is necessary in some instances. The bolts 22 and lock nuts 42 are commercially available hardened steel bolts and nuts and the puller bar has a specific length and slot width with the slots being substantially exact to enable the puller bar to be snapped in place over the parallel bolts 22. The threaded hole 50 receives the hardened steel central bolt 26 and the swivel and center point head are only slightly greater in diameter than the center bolt 26 with the center bolt 26 exerting axial thrust on the center point head 28.

When necessary to remove the front spindle from the steering arm or knuckle on a four-wheel drive vehicle, the bolts 22 are assembled with respect to the base plate 20 and the base plate and bolts slid over the spindle past the threads 62 onto the unthreaded portion 60. A first existing bearing retaining nut 66 is then threaded onto the threaded portion 62 and turned up to engage the base plate 20 by hand. A second existing bearing retaining nut 68 is then placed on the spindle and threaded up to engagement with the first nut with these nuts being hand snug only and make sure that the locking pin faces outwardly. The puller bar is then installed on the bolts 22 by slipping over one bolt first and by hand springing the bolt slightly apart popping the puller bar over the other bolt into parallel relation to the base plate 20. The center bolt 26 is then rotated inwardly until it contacts the axle shaft which protrudes out through the spindle with the center point 58 engaging the tapered threaded hole. A wrench is then used to tighten the center bolt and the spindle will be pulled off.

In the event the spindle is extremely tight, a reasonable amount of pressure is exerted on the puller by using the bolt 26 and the puller base plate 20 can then be struck with a heavy hammer with the hammer striking the long side of the base plate in 90° relation to the bolt holes. It may be necessary to tighten the center bolt in several increments and strike the puller base plate on each side in order to break the spindle loose. Once the spindle has been broken loose, continue tightening the center bolt and remove the puller. It is important that the center bolt never be struck on the end since internal axle parts could be damaged. Also, the thickness of the base plate and its relation to the unthreaded portion of the spindle and the exact diameter of the hole 34 closely engaging the spindle will lower the concentration of forces exerted on the spindle so that no damage to the spindle will occur. The round hole 34 closely engaging the spindle is important from a safety reason because a greater force in some instances must be exerted to remove the spindle and there will be no chance of the base plate slipping off and causing injury and the round hole in the base plate also makes it more rigid. The rectangular shape of the base plate provides flat sides on which to strike the base plate thereby reducing the concentration of forces of contact thereby reducing the mushroom effect that takes place when striking a tool thereby providing a long life span to the puller. The structure and design of the puller is such that even a person having the use of only one hand can easily install and use the tool. Also, the puller is made of conventional components with several of the components, such as the bolts, being commercially available items thereby increasing the practicality of the device and reducing the cost of manufacture, repair and replacement of parts.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A spindle puller for removing the front spindle of a four-wheel drive vehicle comprising a plate having an aperture closely receiving the spindle therethrough with the plate adapted to be secured to the spindle by a bearing retaining nut attached to the spindle, a pair of guide bolts extending outwardly from the plate, said bolts being parallel and provided with headed outer ends, a puller bar mounted on said bolts and engaged with the headed ends thereof, an externally threaded bolt extending through an internally threaded aperture in the puller bar, said threaded bolt being aligned with the aperture in the plate and adapted to engage the end of an axle shaft concentric with the spindle, and means on the outer end of the threaded bolt for engagement by a torque transmitting tool to screw the threaded bolt inwardly with the inner end engaged with the axle shaft to exert an outward pulling force on the spindle.

2. The structure as defined in claim 1 wherein said threaded bolt includes a swivel mounted center point on the inner end thereof, said center point including an axially tapered tip adapted to be engaged with an axially inwardly extending central hole in the end of the axle shaft.

3. The structure as defined in claim 1 wherein said means on the outer end of the threaded bolt includes a polygonal head for engagement by a wrench.

4. The structure as defined in claim 1 wherein said plate is rectangular to enable hammer blows to be struck on the edge in generally perpendicular relation to loosen the spindle from the steering arm assembly without damage to the spindle and related components.

5. The structure as defined in claim 1 wherein said parallel bolts are screw threaded into the base and jam nuts on each parallel bolt to lock the bolts to the base.

6. The structure as defined in claim 1 wherein said puller bar includes an inwardly extending slot in each end thereof for closely receiving the guide bolts.

7. The structure as defined in claim 2 wherein said plate is rectangular to enable hammer blows to be struck on the edge in generally perpendicular relation to loosen the spindle from the steering arm assembly without damage to the spindle and related components, said puller bar including an inwardly extending slot in each end thereof for closely receiving the guide bolts.

8. In combination with a steerable front wheel supporting spindle on a front-wheel drive vehicle having a splined axle shaft disposed concentrically therein with a splined end of the axle shaft extending outwardly beyond the threaded outer end portion of the spindle, a tool for removing the spindle comprising a plate having a central hole closely receiving the threaded end portion and an adjacent unthreaded portion of the spindle, bearing retaining nut means threaded onto the spindle to retain the plate thereon, parallel guide means on said plate, a puller bar mounted on said guide means, means on the guide means to limit outward movement of the puller bar, means on said puller bar engaged with the end of the axle shaft, and means interconnecting the puller bar and means engaged with the end of the axle shaft to exert inward force on the axle shaft thereby exerting an outward force on the puller bar, guide means, plate and spindle to remove it from the steering arm assembly.

9. The combination of claim 8 wherein said plate is rectangular and has substantial thickness to enable hammer blows to be struck on selected side edges of the plate without concentrated forces being transmitted to the spindle.

10. The combination of claim 8 wherein said means engaging the end of the axle shaft includes an externally threaded member having a swivel center point on the inner end thereof and a wrench receiving head on the outer end, said threaded member being screw threaded through the puller bar to exert outward reaction force to the spindle.

11. In combination with a steerable front wheel supporting spindle on a front wheel drive vehicle having a splined axle shaft disposed concentrically therein with a splined end of the axle shaft extending outwardly beyond the threaded outer end portion of the spindle, a spindle puller for removing the front spindle comprising a plate having an aperture closely receiving the spindle therethrough with the plate secured to the spindle by a bearing retaining nut attached to the spindle, a pair of guide bolts extending outwardly from the plate, said bolts being parallel and provided with headed outer ends, a puller bar mounted on said bolts and engaged with the headed ends thereof, an externally threaded bolt extending through an internally threaded aperture in the puller bar, said threaded bolt being aligned with the aperture in the plate and adapted to engage the end of an axle shaft concentric with the spindle, and means on the outer end of the threaded bolt for engagement by a torque transmitting tool to screw the threaded bolt inwardly with the inner end engaged with the axle shaft to exert an outward pulling force on the spindle.

* * * * *